US011910170B2

(12) United States Patent
Shumard

(10) Patent No.: US 11,910,170 B2
(45) Date of Patent: Feb. 20, 2024

(54) MID DUAL-SIDE MICROPHONE

(71) Applicant: Shure Acquisition Holdings, Inc., Niles, IL (US)

(72) Inventor: Brent Robert Shumard, Mount Prospect, IL (US)

(73) Assignee: Shure Acquisition Holdings, Inc., Niles, IL (US)

(*) Notice: Subject to any disclaimer, the term of this patent is extended or adjusted under 35 U.S.C. 154(b) by 0 days.

(21) Appl. No.: 17/675,728

(22) Filed: Feb. 18, 2022

(65) Prior Publication Data

US 2022/0279272 A1 Sep. 1, 2022

Related U.S. Application Data

(60) Provisional application No. 63/154,599, filed on Feb. 26, 2021.

(51) Int. Cl.

*H04R 3/00* (2006.01)
*H04R 1/40* (2006.01)
*H04R 1/08* (2006.01)
*H04S 1/00* (2006.01)
*H04R 5/027* (2006.01)

(52) U.S. Cl.

CPC ............... *H04R 3/005* (2013.01); *H04R 1/08* (2013.01); *H04R 1/406* (2013.01); *H04R 5/027* (2013.01); *H04S 1/007* (2013.01); *H04S 2400/15* (2013.01)

(58) Field of Classification Search

CPC .......... H04R 3/005; H04R 1/08; H04R 1/083; H04R 1/406; H04R 9/08; H04R 11/04; H04R 17/02; H04R 5/027; H04S 1/007; H04S 2400/15

USPC ... 381/26, 56, 58, 74, 91, 92, 111, 112, 122, 381/123, 170, 355, 369, 375

See application file for complete search history.

(56) References Cited

U.S. PATENT DOCUMENTS

| | | | |
|---|---|---|---|
| 8,406,436 | B2 | 3/2013 | Craven et al. |
| 9,247,334 | B2 | 1/2016 | Zhang et al. |
| 9,521,500 | B2 | 12/2016 | Zhang et al. |
| 9,924,264 | B2 | 3/2018 | Yoshino |
| 10,003,884 | B2 | 6/2018 | Yoshino |
| 10,547,935 | B2 | 1/2020 | Shumard et al. |
| 2006/0222187 | A1 | 10/2006 | Jarrett et al. |
| 2007/0237340 | A1 | 10/2007 | Pfanzagl-Cardone |

(Continued)

FOREIGN PATENT DOCUMENTS

JP 2007181191 A 7/2007

OTHER PUBLICATIONS

Matt, Introduction to mid-sides recording, Mar. 2020, p. 1-6.*

(Continued)

*Primary Examiner* — William A Jerez Lora

(74) *Attorney, Agent, or Firm* — Banner & Witcoff, Ltd.

(57) ABSTRACT

A microphone device comprising, for example, a mid microphone cartridge and two side microphone cartridges. The mid microphone cartridge may be, for example, a cardioid microphone cartridge, and the side microphone cartridges may each be, for example, a bidirectional microphone cartridge. Each of the mid microphone cartridge and of the two side microphone cartridges may be orthogonal to the other two microphone cartridges. The microphone device, which may be referred to herein as a mid dual-side microphone, may provide a combined pickup pattern, such as a beam and/or a toroid, that may be steerable.

22 Claims, 12 Drawing Sheets

(56) References Cited

U.S. PATENT DOCUMENTS

| | | | | |
|---|---|---|---|---|
| 2008/0219485 | A1* | 9/2008 | Kantola | H04R 3/005 381/303 |
| 2015/0131802 | A1 | 5/2015 | Akino | |
| 2016/0255445 | A1 | 9/2016 | Lafort et al. | |
| 2018/0310096 | A1* | 10/2018 | Shumard | H04R 19/016 |

OTHER PUBLICATIONS

Robert, Acoustic Beamforming Using Microphone Arrays, Jun. 1993, Fig. 5 & p. 13.*

Robjohns, “The Double Mid-Sides Array,” SOS Sound on Sound, <<https://www.soundonsound.com/techniques/double-mid-sides array>>, published Jun. 2017, 7 pages.

* cited by examiner

MID DUAL-SIDE MICROPHONE

CROSS-REFERENCE TO RELATED APPLICATIONS

The present application claims priority to U.S. provisional patent application Ser. No. 63/154,599, filed Feb. 26, 2021, hereby incorporated by reference in its entirety for all purposes.

BACKGROUND

Conventional mid-side microphones have a single cardioid ("mid") cartridge and a single bidirectional ("side") microphone cartridge. The mid cartridge usually directly faces the center of the sound source (for instance, a person singing or speaking) and the side cartridge faces toward the left and right sides, orthogonally away from the center of the sound source. The combination of the mid and side cartridges allows stereo audio to be captured by the side microphone cartridges and a center channel of audio to be captured by the mid microphone cartridge. In addition, the audio signals from the various cartridges may be combined so as to steer a pickup pattern left and right as desired. However, such mid-side microphones are limited in only being able to steer the pickup pattern along a single linear axis. It would be desirable to provide a microphone with more flexibility and more steering capabilities.

The conventional mid-side stereo recording technique uses a single cardioid microphone and a single orthogonally mounted bidirectional microphone as well as a signal multiplexer to manage the separation of the left and right stereo signals that are formed through either summation of the two microphone signals or subtraction. These two opposite polarity signals can be then used to generate a stereo image for playback. Limitations of this technique include the ability to only collect information in a single plane that is defined by the maximum sensitivity directions of the two microphones. The microphone is further limited to generate pickup pattern in the half plane bounded by the bidirectional axis of symmetry, and including the cardioid vector of maximum sensitivity. Additionally, the aggregate signal has a polar pattern and sensitivity that is defined by the angular separation from the axis of symmetry of the cardioid microphone.

SUMMARY

The following summary presents a simplified summary of certain features. The summary is not an extensive overview and is not intended to identify key or critical elements.

According to some aspects as described herein, a microphone device comprising at least one mid microphone cartridge and at least two side microphone cartridges is described. The mid microphone cartridge may be, for example, a cardioid microphone cartridge, and the side microphone cartridges may each be, for example, a bidirectional microphone cartridge. Each of the mid microphone cartridge and of the two side microphone cartridges may be orthogonal to the other two microphone cartridges. The microphone device, which may be referred to herein as a mid dual-side microphone, may provide a combined pickup pattern, such as a beam, that may be steerable in at least two dimensions anywhere along a half-sphere region. For example, referring to mid-side geometry where a mid (e.g., cardioid microphone cartridge) is facing the z direction, and the side (e.g., bidirectional microphone cartridge) is facing the +/−x direction, an additional side (e.g., bidirectional microphone cartridge) may be added to face the +/−y direction. By weighting the cartridges by magnitude, the principal angle of pickup may be placed anywhere in a half sphere with a corresponding inverted polarity pickup area 180° rotated about the z axis. These may be separated using known techniques.

According to further aspects described herein, such a microphone device may be configured with a control unit (for example, in the form of circuitry) configured to combine signals from each of the microphone cartridges, where the signals represent or are otherwise based on audio detected by the microphone cartridges. The signals may be combined using weighted summation, for example, to steer a pickup pattern (for example, a beam-shaped pickup pattern) anywhere around a half-sphere region. Additionally, by the application of a Hilbert transform or other frequency dependent phase shift technique on one of the two side cartridges and a summation of the two side cartridges, a toroidal pattern may be generated that may be used to generate a noise cancellation signal picking up audio solely in the plane of the ceiling, which may be subtracted from sound detected from other regions such as using one or more directed beam pickup patterns. This may allow a very low profile, actively and adaptively steerable microphone with advanced processing capabilities that is unique to the conferencing market. To implement the toroidal pattern, one of the signals, from one of the side microphone cartridges, may undergo a 90-degree frequency dependent phase shift, such as via a Hilbert transformation or an analog phase shift circuit. This shifted/transformed signal may be combined (for example, summed) with the signal from the other one of the side microphone cartridges to result in a toroid-shaped pickup pattern produced by the microphone device.

According to further aspects as described herein, the microphone device may be packaged in a structure, such as a housing, that partially or fully encloses the mid microphone cartridge, the side microphone cartridges, and/or the control unit. The structure may be of any shape, such as a cylindrical shape that is about the diameter of a U.S. quarter and about one to two inches tall. The mid microphone cartridge may be oriented to generally direct the strongest portion of its pickup pattern (for example, its cardioid pickup pattern) in a direction out from one of the cylinder ends and along a long axis of the cylinder. The side microphone cartridges may be oriented to generally direct the strongest portions of each of their pickup patterns (for example, their bidirectional pickup patterns) in directions that are orthogonal to the direction of the strongest portion of the mid microphone cartridge pickup pattern and orthogonal to the direction of the strongest portions of the other side microphone cartridge pickup pattern.

According to further aspects as described herein, the microphone device may have two opposing mid microphone cartridges. This may be useful, for example, to provide a spatial microphone and/or to provide a single microphone device that can easily distinguish between two users on opposite sides of the microphone device (such as on opposite sides of a conference table, desk, etc.).

According to further aspects as described herein, the microphone device may be located above a targeted area from which audio is expected to be received. For example, wherein the microphone device is used in a conference room, the microphone device may be connected to the ceiling and be located above a conference table. In such a configuration, a single mid microphone cartridge may be used, and the mid microphone cartridge may face generally downward while the orthogonal side microphone cartridges face generally laterally.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
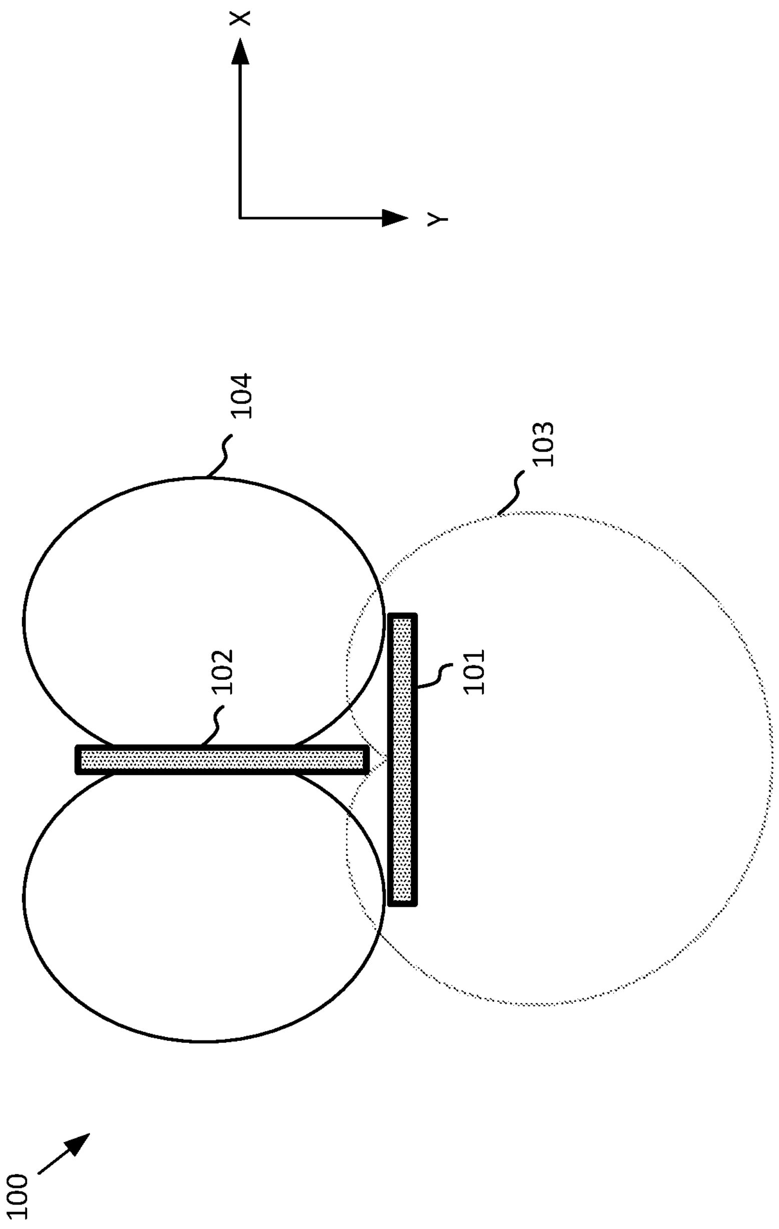
FIG. 1 shows an example mid-side microphone.

The accompanying drawings, which form a part hereof, show examples of the disclosure. It is to be understood that the examples shown in the drawings and/or discussed herein are non-exclusive and that there are other examples of how the disclosed features may be implemented and practiced.

Referring to FIG. 1, a mid-side microphone 100 may have a cardioid microphone cartridge 101 (known as a "mid" cartridge) having a forward pickup pattern 103 directed primarily in a positive direction of the indicated Y axis and a bidirectional microphone cartridge 102 (known as a "side" cartridge) having a side-to-side pickup pattern 104 directed primarily along an X axis that is perpendicular to the Y axis. In such a geometry, cardioid microphone cartridge 101 has a pickup (sensitivity) pattern 103 that may be modeled by $0.5+0.5\sin(\theta)$ or as $0.5+0.5\cos(\theta-90°)$, and bidirectional microphone cartridge 102 has a pickup pattern 104 that may be modeled by $\cos(\theta)$, where θ is the pickup angle in the X-Y plane and θ=0 degrees is parallel to the X axis (e.g., directed leftward or rightward in FIG. 1) and θ=90 degrees is parallel to the Y axis (e.g., directed downward in FIG. 1). The combined pickup pattern, generated by combining pickup patterns of cardioid microphone cartridge 101 and bidirectional microphone cartridge 102, may be determined for example using weighted summation or weighted subtraction in the following expressions that use weights A and B:

For summation:

$$A(0.5+0.5\cos(\theta-90°))+B\cos(\theta) \quad \text{(Eq. 1A):}$$

$$=0.5A+0.5A\cos(\theta-90°)+B\cos(\theta) \quad \text{(Eq. 1B):}$$

$$=0.5A+B\cos(\theta)-0.5A\sin(\theta),\text{ and} \quad \text{(Eq. 1C):}$$

For subtraction:

$$A(0.5+0.5\cos(\theta-90°))-B\cos(\theta) \quad \text{(Eq. 2A):}$$

$$=0.5A+0.5A\cos(\theta-90°)-B\cos(\theta) \quad \text{(Eq. 2B):}$$

$$=0.5A-B\cos(\theta)-0.5A\sin(\theta), \quad \text{(Eq. 2C):}$$

where A+B=1, 0≤A≤1, and 0≤B≤1.

The two sets of expressions (one set for summation, and the other set for subtraction) provide two mirror symmetric pickup patterns that are reflected over the Y axis in opposing polarities. The polar pattern is dependent upon the natural pickup pattern of each microphone cartridge 101 and 102 as well as the angle of separation of the microphone cartridges 101, 102 (the angle of separation determining, at least in part, the values of A and B). This may allow the combined pickup pattern to be altered with respect to the Y-axis, in other words controlled in the positive Y half of the X-Y plane. The device's pickup pattern may be further altered by using a non-cardioid microphone cartridge as the "mid" cartridge, which may involve additional programmatic scaling of the output to maintain sensitivity.

Figure 2B:
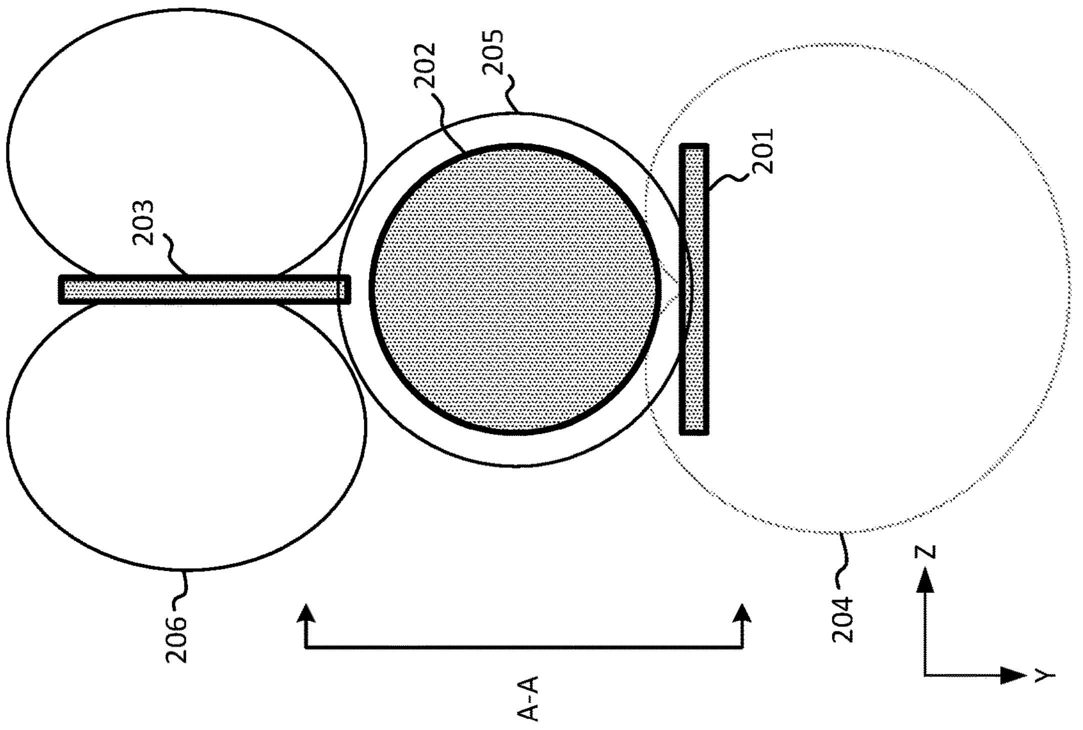
FIG. 2B shows the example mid-dual-side microphone of FIG. 2A from a second side view that is perpendicular to the first side view.
Figure 2A:
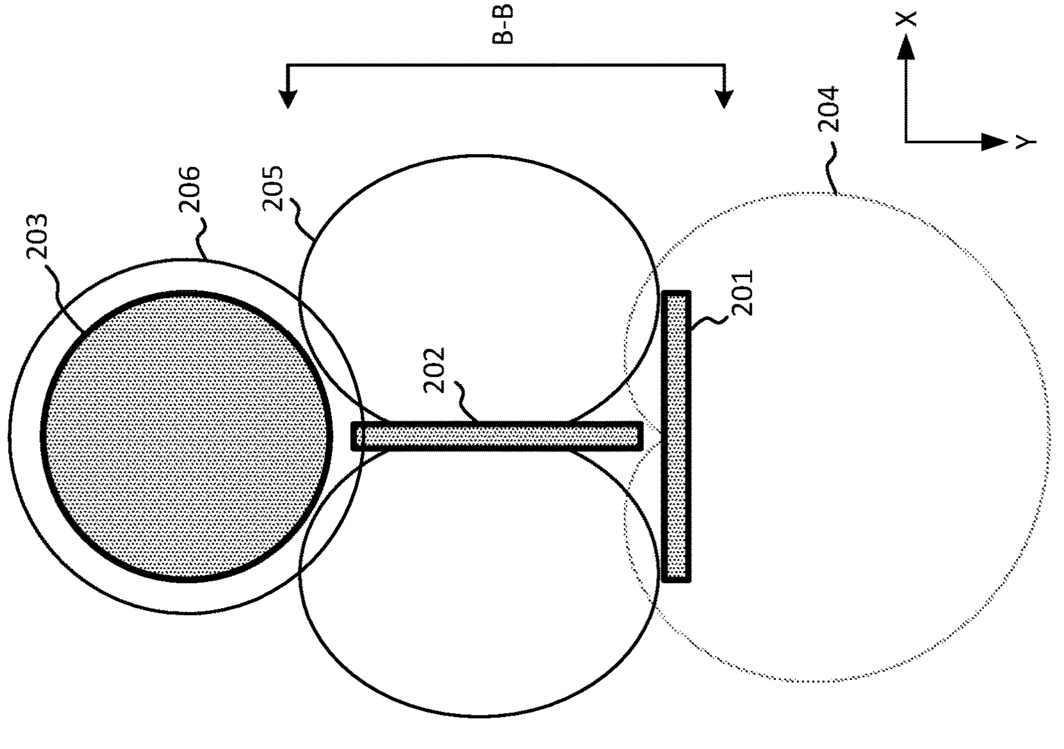
FIG. 2A shows an example mid-dual-side microphone from a first side view.
Figure 3:
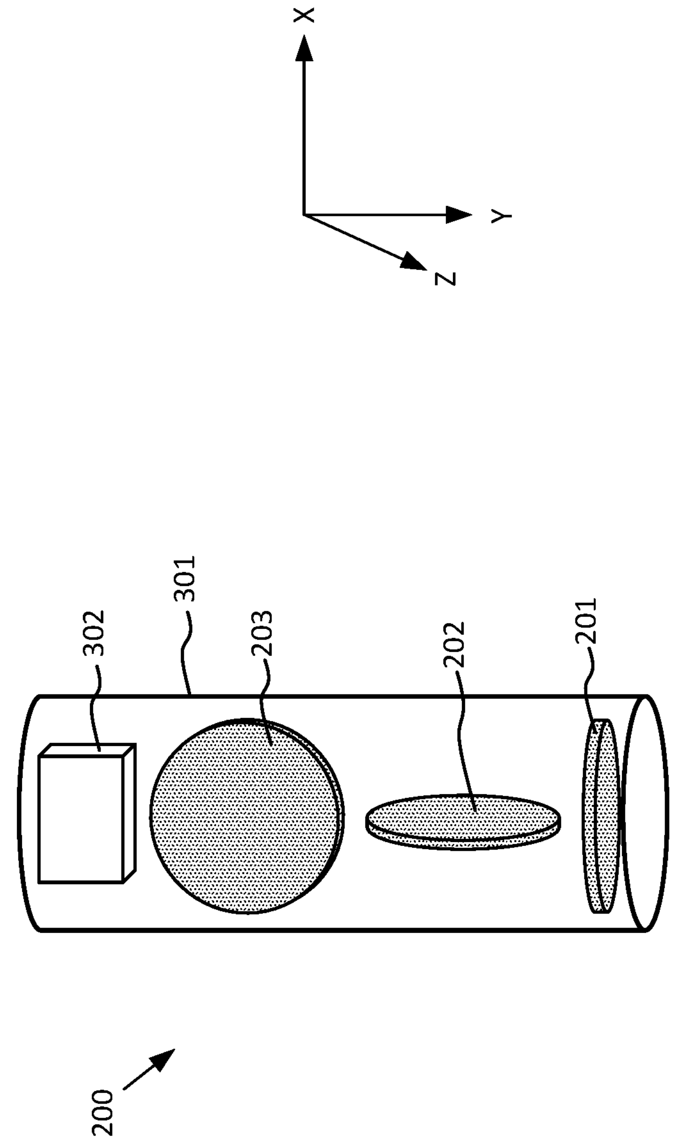
FIG. 3 shows the example mid-dual-side microphone of FIGS. 2A and 2B from a perspective view.

FIGS. 2A, 2B, and 3 show an example of a device 200 (e.g., a microphone) from two perpendicular points of view. FIG. 2A shows microphone 200 from a point of view where the Z-axis extends into and out of the page, the X-axis extends left/right, and the Y axis extends up/down, and is drawn from the "A-A" point of view indicated in FIG. 2B. Conversely, FIG. 2B shows device 200 from a point of view where the X-axis extends into and out of the page, the Z-axis extends left/right, and the Y axis extends up/down, and is drawn from the "B-B" point of view (which is perpendicular to the A-A point of view) indicated in FIG. 2A. FIG. 3 shows a perspective view of device 200.

As shown by way of example in FIGS. 2A, 2B, and 3, device 200 may comprise three microphone cartridges that are each oriented such that each microphone cartridge (and/or its respective pickup pattern) is mainly directed perpendicularly to the pickup patterns of the other two microphone cartridges. For example, each microphone cartridge and/or its respective pickup pattern may be mainly directed along a different one of the X axis, Y axis, and Z axis directions, however the microphone cartridges and associated pickup patterns may be oriented as a group in any orientation relative to X, Y, and Z axes. In the example shown in FIGS. 2A, 2B, and 3, device 200 may comprise a "mid" microphone cartridge 201 (e.g., a cardioid microphone cartridge) directed along the Y-axis direction and/or having a natural "mid" pickup pattern 204 directed away from device 200 mainly along the Y-axis direction, a first "side" microphone cartridge 202 (e.g., a bidirectional microphone cartridge) directed along the X-axis direction and/or having a natural "side" pickup pattern 205 directed away from device 200 mainly along the X-axis direction, and a second "side" microphone cartridge 203 (e.g., another bidirectional microphone cartridge) directed along the Z-axis direction and/or having a natural "side" pickup pattern 206 directed away from device 200 mainly along the Z-axis direction. Because device 200 has a mid cartridge and two side cartridges, device 200 is an example of what will be referred to herein as a mid-dual-side microphone, or alternatively as a single-mid dual-side microphone. Mid microphone cartridge 201 may be, for example, a cardioid microphone cartridge. Each of side microphone cartridges 202, 203 may be for example, a bidirectional microphone cartridge.

Using such an arrangement, device 200 may be able to steer a bidirectional polar pickup pattern anywhere in a half-sphere region by performing a weighted summation on signals from the two bidirectional microphone cartridges 202 and 203. Such a configuration of device 200 may provide an expansion on mid-side microphone 100, and may allow for an arbitrary number of first order polar pattern signals to be steered anywhere in a half sphere region to generate and steer desired pickup patterns and/or null regions. By weighting the cartridges by magnitude, the principal angle of pickup may be placed anywhere in a half sphere with a corresponding inverter polarity pickup area 180 degrees rotated about the Z-axis. These may be separated using known techniques.

In general, a virtual bidirectional beam pickup pattern may be steered anywhere in the X-Z plane via weighted summation. For example, a combined pickup pattern (for example, the steered beam) that is generated by combining pickup patterns of bidirectional microphone cartridge 202 and bidirectional microphone cartridge 203 may be determined using weighted summing in the following expressions that use weights A and B, where Bi1 refers to the individual pickup pattern of one of the two bidirectional microphone cartridges (for example, side microphone cartridge 202) and Bi2 refers to the individual pickup pattern of the other of the two bidirectional microphone cartridges (for example, side microphone cartridge 203):

$$Bi1=\cos(\theta) \text{ and} \quad \text{(Eq. 3A)}$$

$$Bi2=\cos(\theta-90°). \quad \text{(Eq. 3B)}$$

To combine:

$$(A*Bi1)+(B*Bi2) \quad \text{(Eq. 4A):}$$

$$=A*\cos(\theta)+B*\cos(\theta-90°) \quad \text{(Eq. 4B):}$$

$$=A*\cos(\theta)+B*\sin(\theta) \quad \text{(Eq. 4C):}$$

$$=\sqrt{(A^2+B^2)}*\cos(\theta-\tan^{-1}(B/A)) \quad \text{(Eq. 4D):}$$

$$=\sqrt{(A^2+B^2)}*\cos(\theta-\omega), \quad \text{(Eq. 4E):}$$

where $\sqrt{(A^2+B^2)}=1$, $-1\le A\le 1$, $-1\le B\le 1$, and $\omega$ (the azimuth angle)$=\tan^{-1}(B/A)$.

These expressions, and particularly the final expression, show that two orthogonally-oriented bidirectional microphone cartridges (e.g., microphone cartridges 202 and 203) may be used to provide a virtual bidirectional microphone cartridge that can be oriented with the highest sensitivity at any desired angle around the X-Z plane. Moreover, the pickup patterns of all three microphone cartridges 201, 202, and 203 may be combined using weighted summing that uses weights A, B, C, and D as follows to generate a virtual beam pickup pattern, where M is the pickup pattern of the mid microphone cartridge 201:

$$M=0.5+0.5\sin(\theta). \quad \text{(Eq. 5):}$$

To combine:

$$C((A*Bi1)+(B*Bi2))+(D*M) \quad \text{(Eq. 6A):}$$

$$=C(A*\cos(\theta)+B*\cos(\theta-90°))+D(0.5+0.5\sin(\theta)) \quad \text{(Eq. 6B):}$$

$$=C(A*\cos(\theta)+B*\sin(\theta))+D(0.5+0.5\sin(\theta)) \quad \text{(Eq. 6C):}$$

$$=C(\sqrt{(A^2+B^2)}*\cos(\theta-\tan^{-1}(B/A)))+D(0.5+0.5\sin(\theta)), \quad \text{(Eq. 6D):}$$

where $\sqrt{(A^2+B^2)}=1$, $-1\le A\le 1$, $-1\le B\le 1$, $0\le C\le 1$, and $0\le D\le 1$.

In addition to basic steered beams, the use of two such orthogonal bidirectional side microphone cartridges 202 and 203 (with or without mid microphone cartridge 201) may further be used to generate a toroid-shaped pickup pattern at the bounding plane. To accomplish this, a 90-degree phase shift (for example, by using analog phase shifting circuitry or by using a digital Hilbert transformation) may be applied to the signal from one of the two side microphone cartridges, and the resulting 90-degree shifted side cartridge output signal may be summed with the signal from the other of the two side cartridges to generate a toroidal pickup pattern in the X-Z plane. Such a toroidal pickup pattern may be useful, for example, where device 100 is located above an area of interest, such as located in or at the ceiling of a room, for generating a noise cancellation signal and that is picking up audio (noise) at or near in the plane of the ceiling. The noise picked up by the toroid pattern may, for example, include noise from ceiling-mounted air handlers, projector fans, etc., that may be canceled out (subtracted) by circuitry connected to device 200 or by device 200 itself (such as using control unit 302). The structures and functionality described herein may allow a very low profile, actively and/or adaptively steerable microphone with advanced capabilities that may be unique to the conferencing market.

As further shown in FIG. 3, device 200 may also comprise a structure 301 (such as a housing) that retains microphone cartridges 201, 202, 203 in their respective positions and orientations with respect to one another. Structure 301 may partially or completely enclose any or all of microphone cartridges 201, 202, and/or 203. While in the illustrated example, structure 301 is shown as a cylindrical housing, structure 301 may be of any shape, and may be located exteriorly to and/or interiorly to microphone cartridges 201, 202, and/or 203. For example, structure 301 may comprise a rod extending between and physically connecting microphone cartridges 201, 202, and/or 203, and/or may comprise one or more clamps or other retaining structures for holding microphone cartridges 201, 202, and/or 203 in position.

Figure 4:
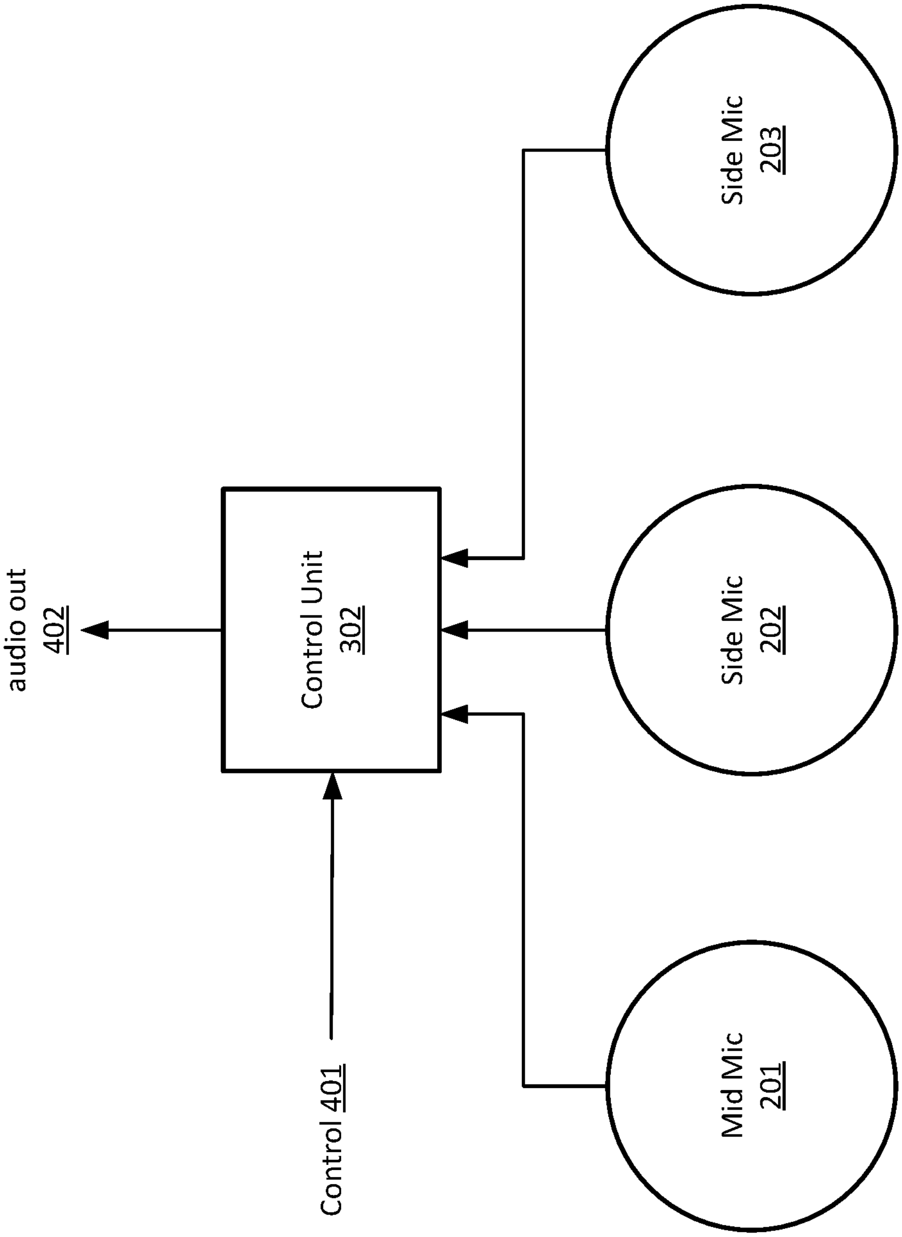
FIG. 4 is an example schematic representation of a mid-dual-side microphone.

Device 201 may further comprise a control unit 302, which may be retained by structure 301, and may be partially or fully enclosed by structure 301. As shown in FIG. 4, control unit 302 may be communicatively (e.g., electrically) connected to microphone cartridges 201, 202, and/or 203, so as to receive one or more signals from these microphone cartridges. These one or more received signals (referred to herein as audio signals) may represent sound detected by (picked up by) the microphone cartridges, and may be digital signals or analog signals that encode audio detected by microphone cartridges 201, 202, and/or 203. Control unit 302 may perform one or more operations on the received audio signals, such as mathematical operations, digital operations, analog operations, and/or signal processing operations, and may output one or more signals (e.g., audio out signal 402) resulting from the operations. The one or more signals output by control unit 302, as a result of these operations, may be digital signals or analog signals and may encode processed audio and/or other information that was determined based on the operations. Control unit 302 may also receive one or more control signals (e.g., control signal 401). The one or more control signals, and/or a separate input, may additionally provide power from a power source. The one or more control signals may be digital or analog signals and may control one or more modes of operation of control unit 302. For example, the one or more control signals may cause control unit 302 to perform one or more particular operations on the audio signals received from any of the microphone cartridges 201, 202, and/or 203. The one or more control signals may cause control unit 302 to select a particular configuration of one or more beams and/or of a toroid formation, as discussed below.

Control unit 302 may comprise circuitry, such as one or more processors (e.g., central processing units), one or more memories, one or more integrated circuits, one or more field programmable gate arrays (FPGAs), one or more application-specific integrated circuits (ASICs), one or more instances of a system-on-chip (SOC), one or more signal processors such as digital signal processors (DSPs), one or more logic gates, one or more amplifiers (e.g., differential amplifiers), one or more analog-to-digital converters, one or more digital-to-analog converters, and/or circuitry configured to scale audio signals and/or values represented by the audio signals, phase shift audio signals and/or values represented by the audio signals, combine (e.g., sum and/or subtract) audio signals and/or values represented by the audio signals, and/or perform any other mathematical or other types of operations on audio signals and/or values represented by the audio signals. Where one or more processors are used to perform any of the functionality of control unit 302 described herein (such as combining, phase shifting, scaling, calculating, etc.), the one or more memories may store instructions that are executable by the one or more processors to cause control unit 302 to perform such functionality. Any of the functionality may additionally or alternatively be performed using analog or other digital circuitry, such as using operational amplifiers, resistor networks, and the like.

Figure 5:
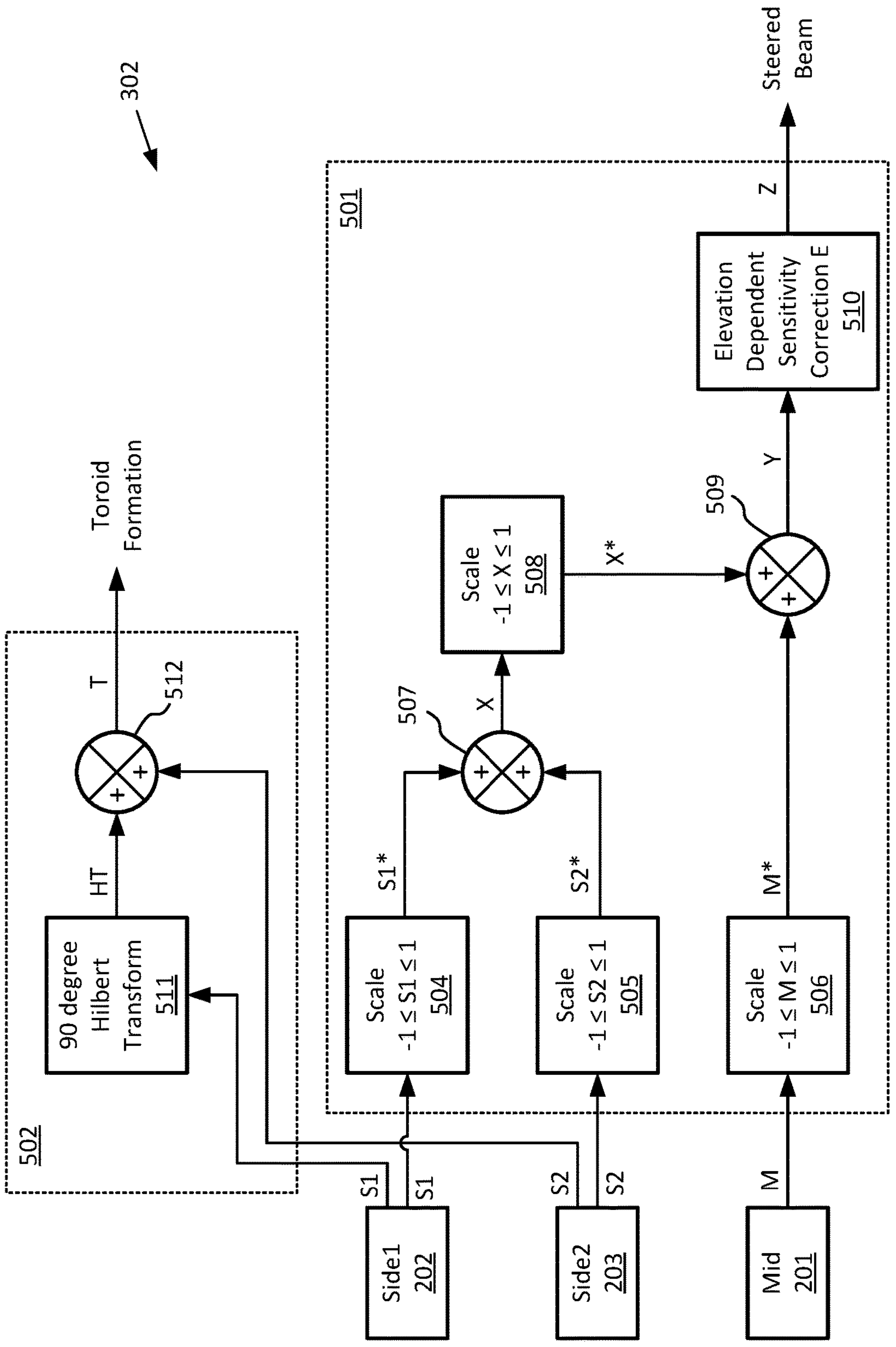
FIG. 5 is an example schematic representation of at least a portion of a control unit of a mid-dual-side microphone.

FIG. 5 is a schematic representation of at least a portion of an example control unit, and in this example the discussion will assume that the shown control unit is control unit 302. As shown, control unit 302 may comprise one or more inputs of audio signals from microphone cartridges 201, 202, and/or 203. These inputs, and the signals carried on these inputs, are referred to as S1 (carrying the audio signal from side microphone cartridge 202), S2 (carrying the audio signal from side microphone cartridge 203), and M (carrying the audio signal from mid microphone cartridge 201). The inputs may be physically and electrically separate inputs, or they may be combined such as where the various audio signals are combined (e.g., using time and/or frequency multiplexing). Each audio signal S1, S2, and M may encode a series (e.g., time series) of values (e.g., numerical values) S1 based on sound detected by the respective microphone cartridge 201-203. For example, S1, S2, and M may each represent or otherwise be based on a sound waveform over time. S1, S2, and M may be represented in analog or digital format, and may be encoded into the audio signals in any manner desired, such as using amplitude modulation, phase modulation, binary signaling, pulse-width modulation, etc. Where the audio signals are analog, control unit 302 may comprise one or more analog-to-digital converters to convert them to digital signals indicative of the time series of values. For example, where signals from the various microphone cartridges are analog, any of elements 201-203 may comprise one or more analog-to-digital converters, in which case any of S1, S2, and/or M may be provided as digital signals. Alternatively, any of elements 504-506 and 511 may comprise one or more analog-to-digital converters, in which case any of S1, S2, and/or M may be provided as analog signals and any of S1*, S2*, M*, and/or HT may be digital signals.

Control unit 302 may further comprise a steered beam unit 501 and a toroid formation unit 502, which may be physically and/or logically separate from one another, and/or they may be physically and/or logically combined with each other. Steered beam unit 501 may comprise one or more scaling units 504, 505, 506, and 508 which may be configured to scale (apply weighting to) values of S1, S2, M, and a combination of scaled outputs labeled "X", to be within expected ranges—for example, by normalizing each of their values to fall within the range of a lowest value (e.g., −1) to a highest value (e.g., +1). In the shown example, scaling unit 504 may scale (e.g., normalize) S1 to be within the range of vales of −1 to +1 to produce a series of scaled values S1*, scaling unit 505 may scale (e.g., normalize) S2 to be within the range of vales of −1 to +1 to produce a series of scaled values S2*, and scaling unit 506 may scale (e.g., normalize) M to be within the range of vales of −1 to +1 to produce a series of scaled values M*. While a normalization range of −1 to +1 is used in this example, any normalization range may be used.

Scaled values S1*and S2*may be combined using a combiner 507 to produce a series of values X that are based on S1*and S2*. For example, S1*and S2*may be summed (using, for example, strict summation) together to produce X. Thus, X may be determined based on S1*and S2*. X may then be scaled (e.g., normalized) by a scaling unit 508 to be within a normalization range, such as within the range of values −1 to +1, to produce a series of scaled values X*. X* may be combined with M* using a combiner 509 to produce values Y. Thus, Y may be determined based on X* and M*. For example, Y may be based on a difference between X* and M*, for example, Y=X*−M*.

Scaling units 504 and 505 may scale S1 and S2 to produce S1*and S2*such that:

$$-1 \le S1^* \le 1, \quad \text{(Eq. 7A):}$$

$$-1 \le S2^* \le 1, \text{ and} \quad \text{(Eq. 7B):}$$

$$\sqrt{((S1^*)^2+(S2^*)^2)}=1. \quad \text{(Eq. 7C):}$$

Scaling units 504 and 505 may further scale S1 and S2 in a manner that affects the channel azimuth steering angle ω for a desired steered beam pickup pattern. For example, the channel azimuth steering angle ω may be based on S1*and S2*as follows:

$$\text{channel azimuth steering angle } \omega=\tan^{-1}(S2^*/S1^*). \quad \text{(Eq. 8):}$$

Therefore, S1*and S2*may be determined (e.g., scaled) to meet the above-stated conditions of Eqs. 7A-7C and to result in a desired channel azimuth steering angle in accordance with Eq. 8. The desired channel azimuth steering angle may be defined by or otherwise based on, for example, control signal 401. Referring for example to Eqs. 3A-B, 4A-E, 5, and 6A-6D, value A in those expressions may be the scaling factor of scaling unit 504 (which scales 51 to S1*), and value B in those expressions may be the scaling factor of scaling unit 505 (which scales S2 to S2*). Example conditions for those scaling factors are given in Eqs. 7A-7C and 8. The scaling factors of scaling units 504 and 505 may be further determined based on control signal 401.

Scaling units 506 and 508 may scale M and X to produce M* and X* such that:

$0 \leq X^*$ and $M^* \leq 1$, and (Eq. 9A):

either $X^*=1$ or $M^*=1$. (Eq. 9B):

Scaling units 506 and 508 may further scale M and X in a manner that affects the channel azimuth steering angle for a desired steered beam pickup pattern. For example, M* and X* may be determined based on a desired channel inclination angle in accordance with the following expression:

channel inclination angle $=\tan^{-1}(0.5M^*/X^*)$. (Eq. 10):

Therefore, M* and X* may be determined (for example, scaled from M and X, respectively) to meet the above-stated conditions of Eqs. 9A-9B and to result in the desired channel inclination angle in accordance with Eq. 10. The desired channel inclination angle may be defined by or otherwise based on, for example, control signal 401. Referring for example to Eqs. 3A-B, 4A-E, 5, and 6A-6D, value C in those expressions may be the scaling factor of scaling unit 508 (which scales X to X*), and value D in those expressions may be the scaling factor of scaling unit 506 (which scales M to M*). Example conditions for those scaling factors are given in Eqs. 9A-B and 10. The scaling factors of scaling units 506 and 508 may be further determined based on control signal 401. All equations and other mathematical expressions disclosed herein (above and below) are merely examples and may be differ depending upon, for example, desired beam characteristics and desired normalization ranges for S1*, S2*, M*, and X*.

The desired channel inclination angle (or more specifically, the related values X* and M*) of a steered beam may be used to adjust Y. For example, an elevation dependent sensitivity correction unit 510 may adjust Y with an elevation dependent sensitivity correction factor E as follows:

$E=1/[\sqrt{(X^{*2}+0.25M^{*2})}+0.5M^*]$, and (Eq. 11A):

$Z=F(E,Y)$, (Eq. 11B):

where function F may be a multiplication or scaling where the scalar is equal to or otherwise based on E, for example Z=F(E,Y) may be implemented as Z=Y*E. Thus, E may be determined based on X* and M* in accordance with Eq. 11A (where X* and M* may be determined based on the desired channel inclination angle in accordance with Eqs. 9A, 9B, and 10), and Z may be determined based on E and Y in accordance with Eq. 11B. The resulting signal Z may be representative of sound detected by microphone cartridges 201-203 using a steered beam pickup pattern having the desired channel inclination angle.

Toroid formation unit 502 may comprise a Hilbert transform unit 511 that implements a 90 degree Hilbert transform on S1. A Hilbert transform on a function or signal produces a −90 degree phase shift to Fourier components of the function or signal, and so in this example Hilbert transform unit 511 may produce a −90 degree phase shift to Fourier components of S1. The resulting Hilbert-transformed output HT from unit 511 may be combined with S2 (for example, by summing HT and S2 together) using a combiner 412 to produce a signal T that may be representative of sound detected by side microphone cartridge 202 and by side microphone cartridge 203 using a toroid-shaped pickup pattern (a “toroid formation” pickup pattern).

Figure 9:
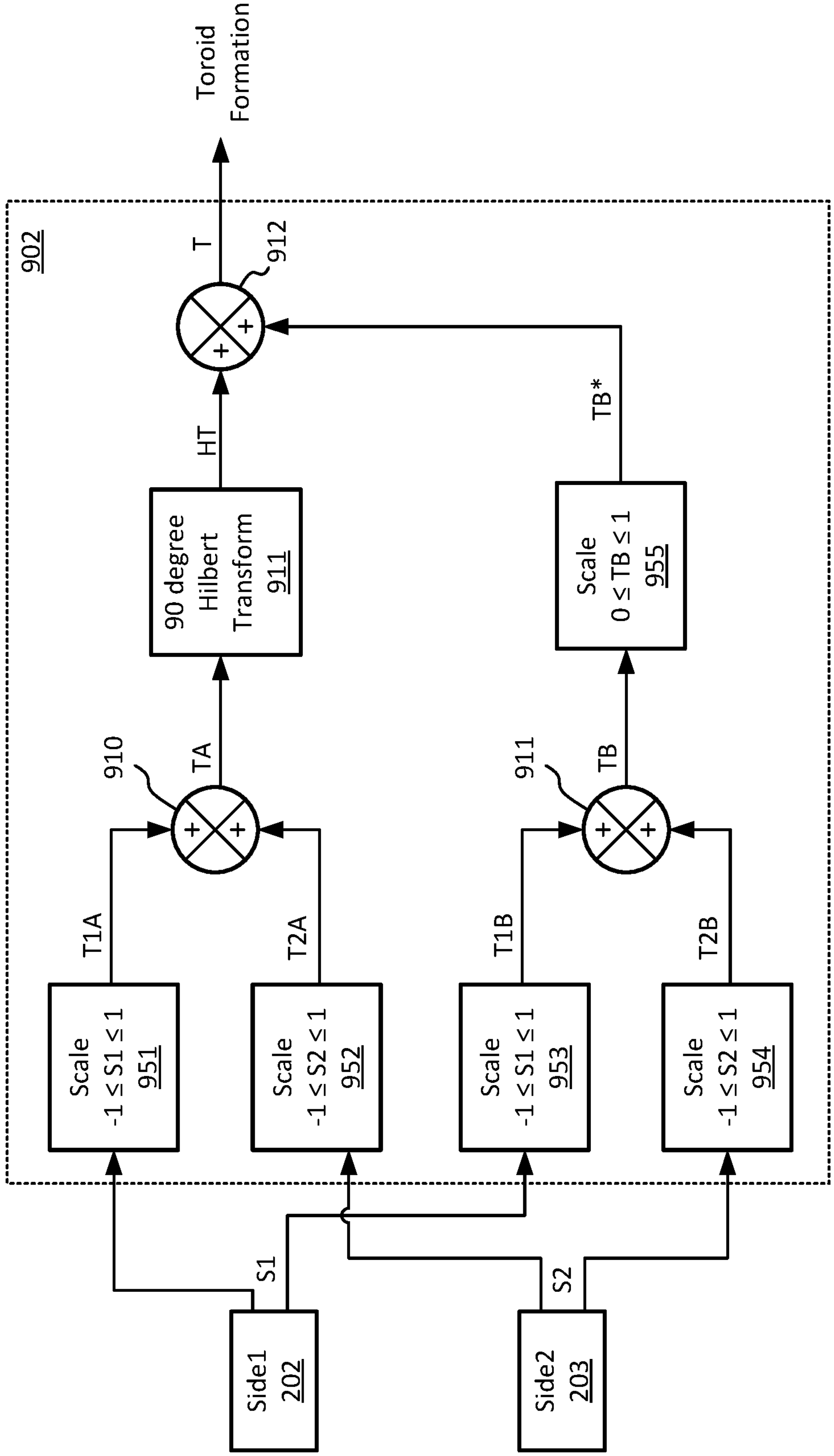
FIG. 9 is another example schematic representation of at least a portion of a control unit of a mid-dual-side microphone.

Characteristics (e.g., the eccentricity or ovalness of) the toroid pickup pattern represented by T may be determined and altered by appropriately scaling signals S1 and/or S2. Moreover, the orientation of the point of greatest pickup for the toroid pickup pattern may be manipulated in the same way as the azimuth angle is manipulated (for example, in accordance with Eq. 8), and may be performed using two corresponding orthogonally-formed bidirectional signals that could then be scaled and phase shifted. For example, FIG. 9 shows another example of a toroid formation unit 902, which may be used in place of toroid formation unit 502 in FIG. 5 (thus, elements 501 and 902 could be used together), and which may be used to control the eccentricity of the toroid formation. Toroid formation unit 902 may include scaling units 951 and 953 each configured to receive S1, and scaling units 952 and 954 each configured to receive S2. Similar to the discussion above regarding analog-to-digital converters in FIG. 5, any of elements 202-203 and 951-954 in FIG. 9 may comprise one or more analog-to-digital converters, as desired. Scaling unit 951 may scale signal S1 into signal T1A. Scaling unit 953 may scale signal S1 into signal T1B. Scaling unit 952 may scale signal S2 into signal T2A. Scaling unit 954 may scale signal S2 into signal T2B. Combiner 910 may combine (such as using summation) signals T1A and T2A to produce signal TA. Combiner 911 may combine (such as using summation) signals T1B and T2B to produce signal TB. Hilbert transform unit 911 may perform a Hilbert transform (ninety-degree shift) on signal TA to produce signal HT. Scaling unit 955 may scale signal TB to produce signal TB*. Combiner 912 may combine (such as using summation) signals HT and TB*to produce toroid formation signal T.

Eqs. 12A-12B and 13A-13D, below, show an example of how signal TA may be determined. These expressions are similar to the expressions stated above for Eqs. 3A-3B and 4A-4E.

$Bi1=\cos(\theta)$ and (Eq. 12A)

$Bi2=\cos(\theta-90°)$, (Eq. 12B)

where Bi1 is represented by S1 and Bi2 is represented by S2.

Combining to produce TA:

$TA=(A^*Bi1)+(B^*Bi2)$ (Eq. 13A):

$=A^*\cos(\theta)+B^*\cos(\theta-90°)$ (Eq. 13B):

$=A^*\cos(\theta)+B^*\sin(\theta)$ (Eq. 13C):

$=\sqrt{(A^2+B^2)}^*\cos(\theta-\tan^{-1}(B/A))$ (Eq. 13D):

$=\sqrt{(A^2+B^2)}^*\cos(\theta-\phi)$, (Eq. 13E):

where $\sqrt{(A^2+B^2)}=1$, $-1 \leq A \leq 1$, $-1 \leq B \leq 1$, and $\phi=\tan^{-1}(A/B)$, which is the major axis angle for the eccentric toroid formation.

The above equations produce a first bidirectional pattern as part of the toroid formation. The above equations (particularly Eq. 13E) can be extended to simultaneously produce a complementary (orthogonal) second bidirectional pattern as part of the toroid formation, by producing signal TB such as shown below in Eq. 14:

$TB=\sqrt{(C^2+D^2)}^*\cos(\theta-\phi\pm 90°)$, (Eq. 14):

where $\sqrt{(C^2+D^2)}=1$, $-1 \leq C \leq 1$, $-1 \leq D \leq 1$, and $\phi-90°=\tan^{-1}(C/D)$, which is the minor axis angle for the eccentric toroid formation.

Referring to the example shown in FIG. 9 and described in Eqs. 12A-12B, 13A-13E, and 14, value A may be the scaling factor of scaling unit 951 (which scales S1 to T1A), value B may be the scaling factor of scaling unit 952 (which scales S2 to T2A), value C may be the scaling factor of scaling unit 953 (which scales S1 to T1B), and value D may be the scaling factor of scaling unit 954 (which scales S2 to T2B). Scaling unit 955 may then scale TB to be in a particular range, such as in the range of zero and one, where the scaling of TB determines the desired eccentricity of the toroid formation. Thus, in addition to the example constraints indicated for Eqs. 13A-13E and 14, the scaling of TB into TB*by scaling unit 955, as well as the scaling factors for any of scaling units 951-954, may be determined based on control signal 401. For example, for the minor axis sensitivity to be 6 dB less than the major axis, scaling unit 555 may scale TB*by a scaling factor of 0.5. In other words, TB*may equal (Q)(TB), where Q in this example=0.5.

The determination of the toroid formation pickup pattern represented by signal T, and the determination of the steered beam pickup pattern represented by signal Z, may be performed simultaneously in parallel or in alternative modes. For example, control unit 302 may operate in a first mode to determine and produce signal Z corresponding to a steered beam pickup pattern, and may operate in a second mode to determine and produce signal T corresponding to a toroid formation pickup pattern. In such a case, control unit 302 may select either mode based on, for example, control signal 401. For example, control signal 401 may comprise a first value (e.g., first data, or a first voltage and/or current) corresponding to the first mode and a second value (e.g., second data, or a second voltage and/or current) corresponding to the second mode. Audio out signal 402 may comprise, or otherwise be based on, signal T and/or signal Z. Which signal audio out signal 402 is based on may depend upon the mode that device 200 is set to. For example, audio out signal 402 may be or include signal Z in the first mode and may be or include signal T in the second mode.

Figure 6A:
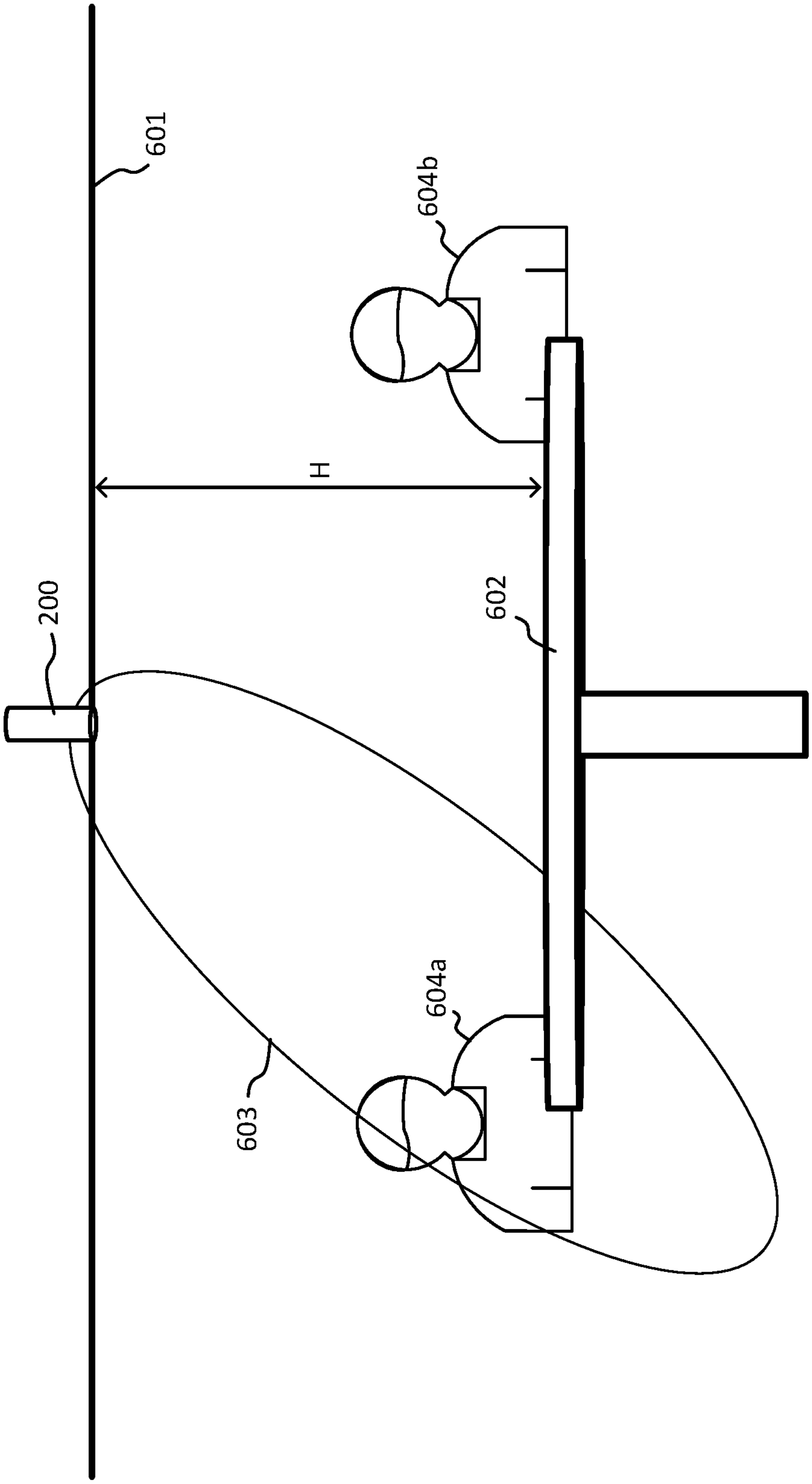
FIGS. 6A and 6B are side views of an example environment in which a mid-dual-side microphone may produce one or more beam-formed pickup patterns.

FIG. 6A is a side view of an example environment in which a mid-dual-side microphone, such as device 200, may produce a beam-formed pickup pattern. As shown, device 200 may be positioned within and/or above a ceiling 601, such that front microphone cartridge 201 is facing downward toward a room under ceiling 601. For example, device 200 may be oriented in the same direction as shown in FIG. 3. While device 200 is shown having its bottom (e.g., front) face generally flush with the bottom surface of ceiling 601, device 200 may alternatively be completely set back from the bottom surface of ceiling 601 or partially or fully underneath the bottom surface of ceiling 601. For example, device 200 may hang beneath or otherwise be mounted beneath ceiling 601. In any of these examples, device 200 may be located generally above a region (for example, a conference table 602) where sound is expected to be detected by device 200. For example, device 200 may be located above the region (for example, above conference table 602) by a height H, where H may be any value such as (and not limited to) four feet or greater, or in the range of about six feet to about twelve feet, or greater than ten feet, etc. Based on a shape, size, and/or direction of a desired steered-beam pickup pattern 603 (e.g., as indicated by control signal 401), controller 302 of device 200 may determine scaling and/or combining of received sound (represented by signals S1, S2, and M) to produce scaled signals S1*, S2*, and M*, and to ultimately produce signal Z representing sound detected using steered-beam pickup pattern 603. Audio out signal 402 may comprise or otherwise represent signal Z.

In the shown example, steered-beam pickup pattern 603 may be directed generally toward a person 604*a*, such that when person 604*a* speaks, that speech is more easily detected than speech from another person 604*b* located in a different part of the room. If a different steered-beam pickup pattern is desired (e.g., as indicated by control signal 401), then different scaling and/or combining of S1, S2, and M may be performed corresponding to that different steered-beam pickup pattern.

Figure 6B:
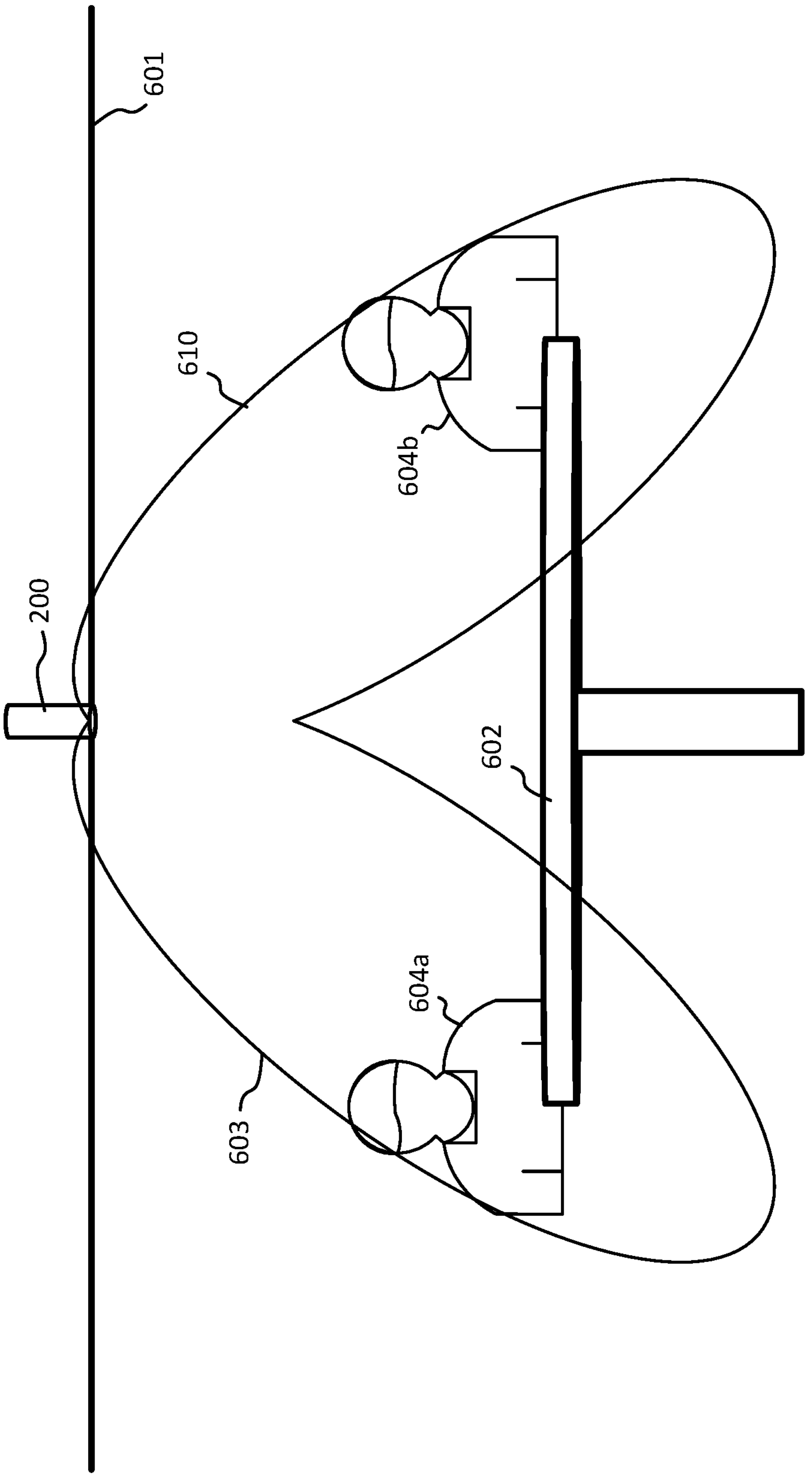
Figure 7:
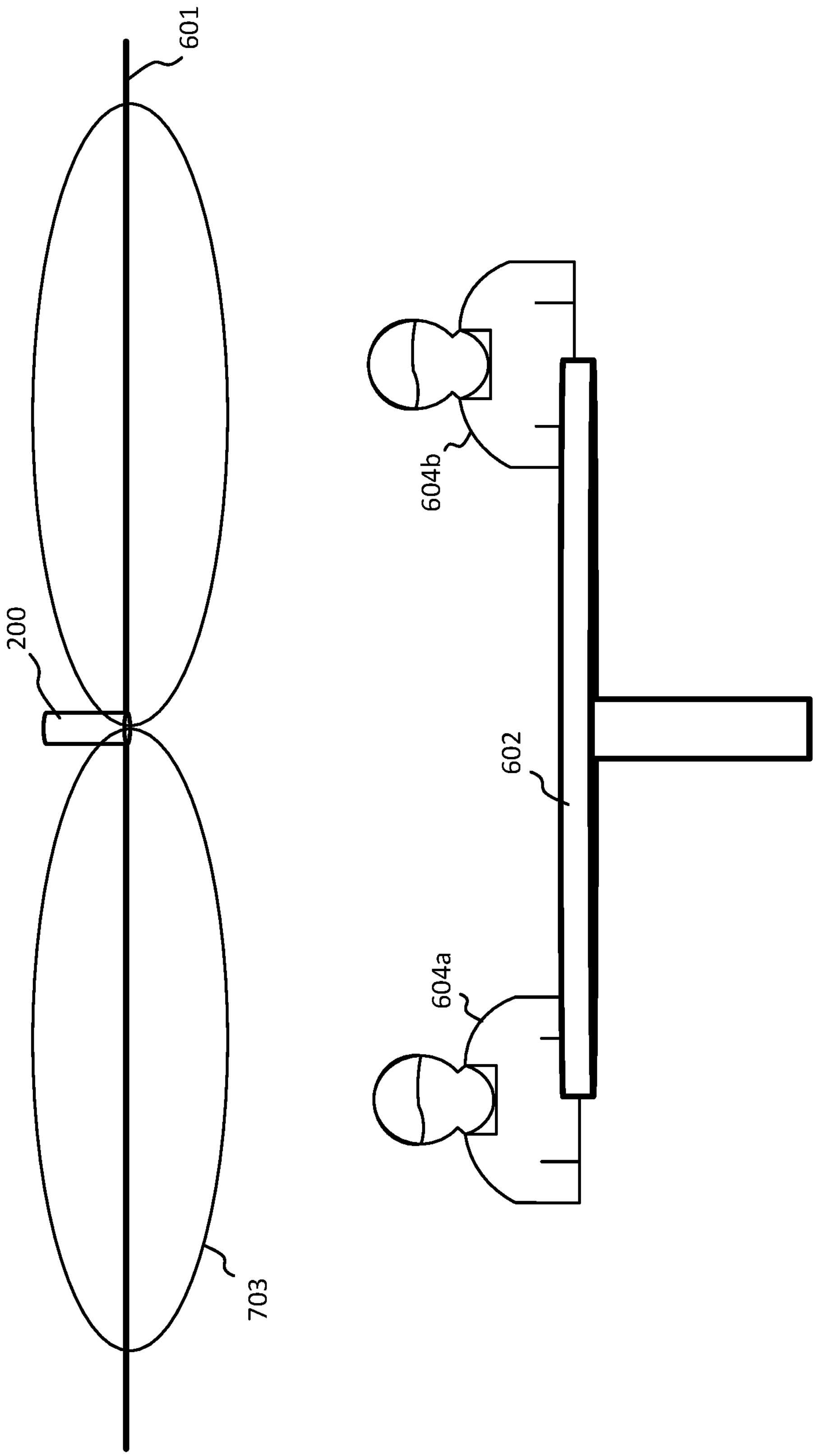
FIG. 7 is a side view of an example environment in which a mid-dual-side microphone may produce a toroid formation pickup pattern.
Figure 8:
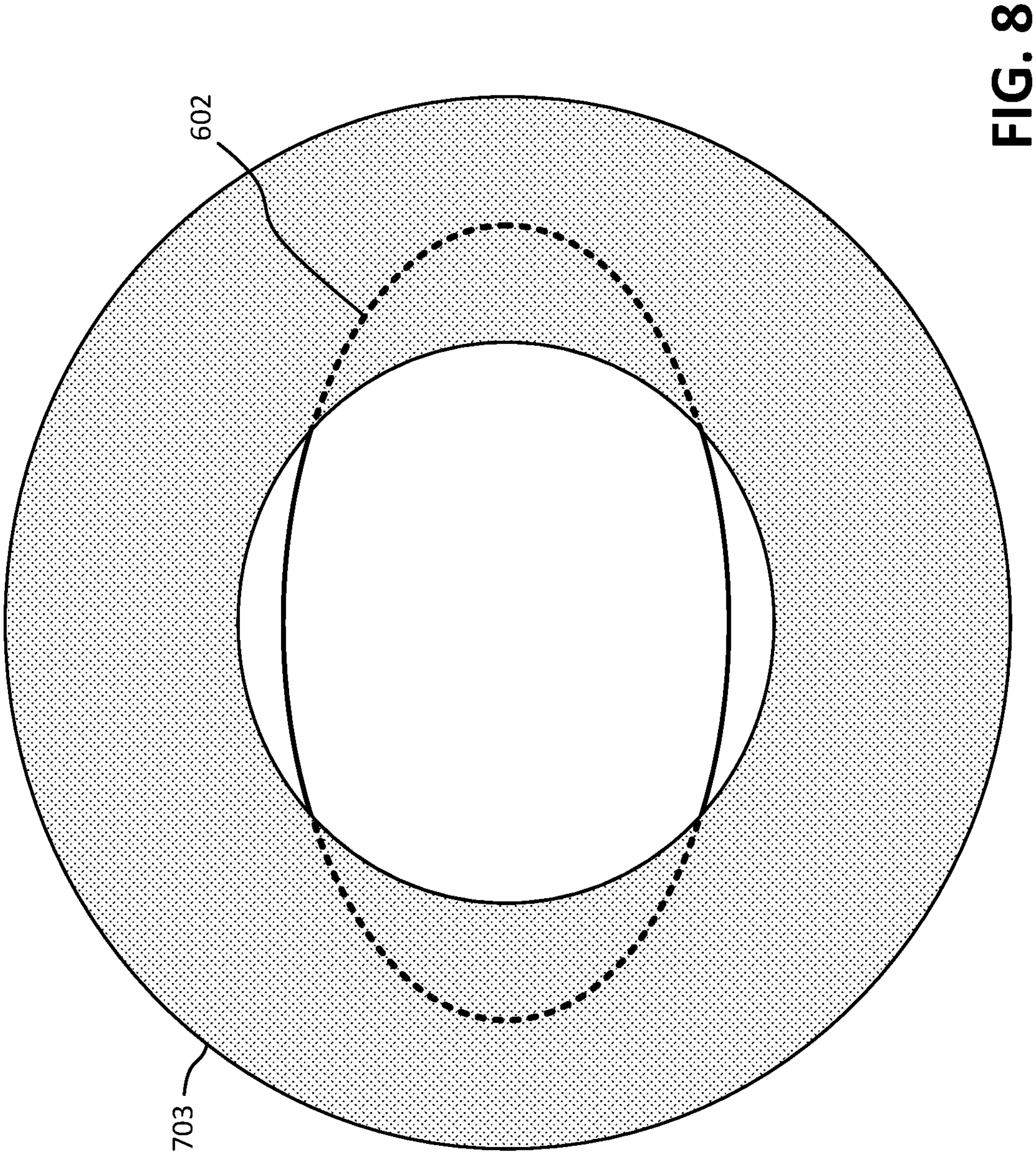
FIG. 8 is a cross-sectional view, taken from above, of the example environment shown in FIG. 7.

FIG. 7 is a side view of an example environment in which a mid-dual-side microphone, such as device 200, may produce a toroidal polar formation pickup pattern 703. Device 200 may be generally located and oriented as described above with regard to FIGS. 6A and 6B. Based on a shape, size, and/or eccentricity of the desired toroid formation pickup pattern 703 (for example, as indicated by control signal 401), controller 302 of device 200 may determine scaling and/or combining of received sound (represented by signals S1 and S2), using toroid formation unit 502 or 902, to produce signal T representing sound detected using toroid formation pickup pattern 703. In such a case, audio out signal 402 may comprise or otherwise represent signal T. FIG. 8 shows a cross section of toroid formation pickup pattern 703, at a height just under ceiling 601, and from an overhead view of the environment of FIG. 7. The cross-section of FIG. 8 shows that the cross-section of toroid formation pickup pattern 703 may have a hollow region in its center. Also, while the cross-section of toroid formation pickup pattern 703 is shown as generally circular in the example of FIG. 8, toroid formation pickup pattern 703 may have eccentricity such that it has an oval cross-section (e.g., longer in the left-right direction of FIG. 8 than in the up-down direction, or vice-versa).

Figure 11:
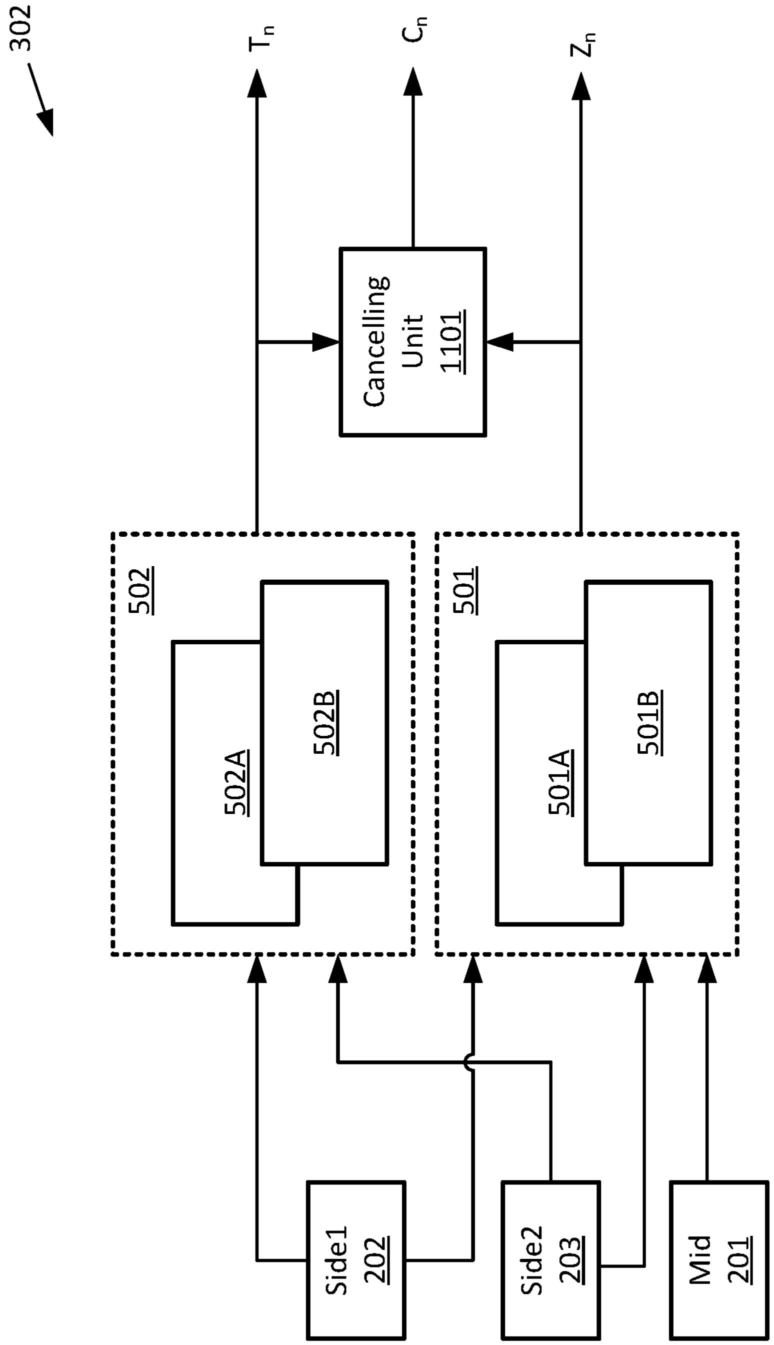
FIG. 11 shows another example schematic representation of at least a portion of a control unit of a mid-dual-side microphone.

If desired, two or more pickup patterns, e.g., one or more steered beam pickup patterns and/or one or more toroid formation pickup patterns, may be implemented simultaneously by device 200. For example, a first steered beam pickup pattern may be directed toward person 604*a* and, simultaneously, a second steered beam pickup pattern may be directed toward person 604*b*. Where multiple pickup patterns are used, one pickup pattern may be assigned as a first (e.g., left) audio channel and another pickup pattern may be assigned as a second (e.g., right) audio channel, which together may provide a stereo audio channel. An example of this is shown in FIG. 6B, in which two simultaneous steered beam pickup patterns 603 and 610 are produced. In other examples, at least one steered beam pickup pattern and at least one toroid formation pickup pattern may be simultaneously produced, such as by operating steered beam unit 501 and toroid formation unit 502 (or 902) simultaneously using common input signals S1, S2, and M. To implement multiple simultaneous steered beam pickup patterns, control unit 302 may comprise multiple parallel (and simultaneous) instantiations of the processing chain of steered beam unit 501 to generate multiple output signals Zn, where n represents the nth parallel instantiation of the processing chain. For example, FIG. 11 shows another variation of at least a portion of control unit 302, in which control unit 302 comprises a plurality of parallel instantiations of toroid formation unit 502 (in this example, instantiations 502*a* and 502*b*) and a plurality of parallel instantiations of steered beam unit 501 (in this example instantiations 501*a* and 501*b*). Each instantiation may operate simultaneously with the other instantiations. Toroid formation unit 902 may be used rather than toroid formation unit 502, such that control unit 302 comprises a plurality of parallel instantiations of toroid formation unit 902. Each toroid formation signal Tn may be produced by a corresponding one of the toroid formation unit 502 instantiations, and each steered beam signal Zn may be produced by a corresponding one of the steered beam unit 501 instantiations. A cancelling unit 1101 may cancel out Tn from each corresponding Zn. (for example, subtract each Tn from its corresponding Zn) to produce a corresponding audio signal Cn. The audio out signal 402 may comprise any one or more of Tn, Cn, and/or Zn. Thus, control unit 302 as shown in FIG. 11 may generate one or more simultaneous different toroid formation pickup patterns and/or one or more simultaneous different steered beam pickup patterns, as desired.

Figure 10:
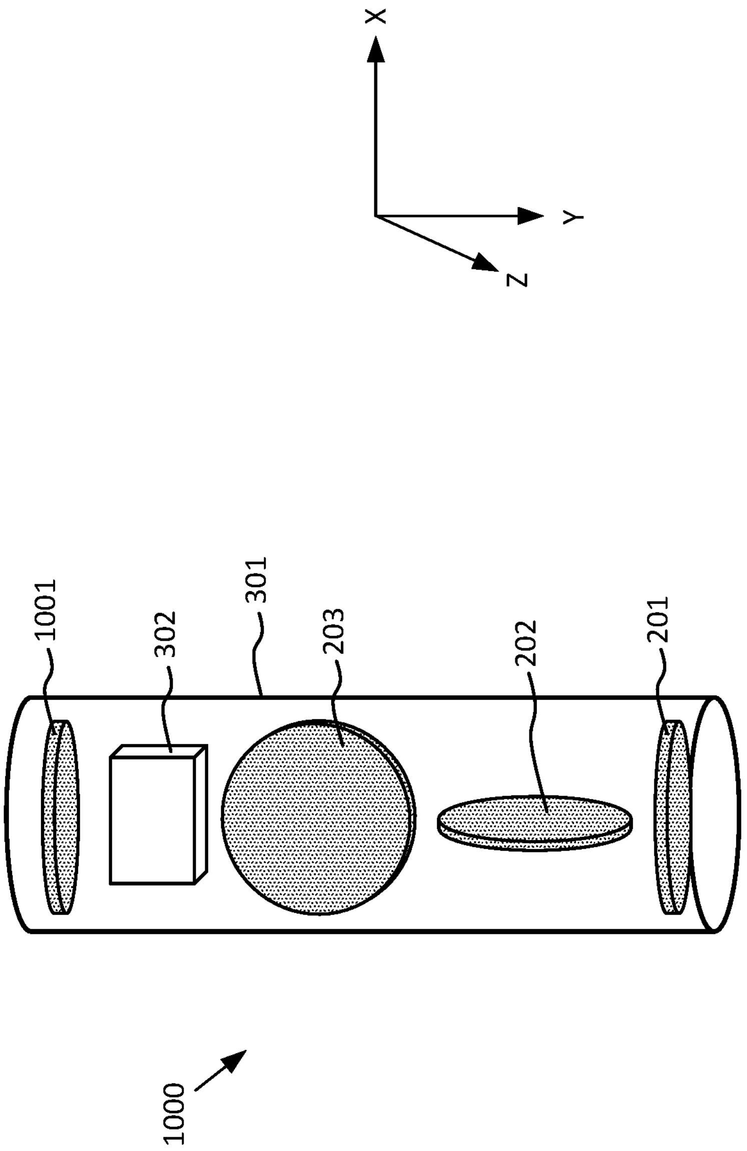
FIG. 10 shows an example dual-mid dual-side microphone from a perspective view.

FIG. 10 shows another example of a device 1000 that comprises the elements of device 200 (structure 301, mid microphone cartridge 201, side microphone cartridge 202, side microphone cartridge 203, and control unit 302) as well as another mid microphone cartridge 1001. Mid microphone cartridge 201 and side microphone cartridges 202 and 203 may be oriented and configured as described above with reference to device 200. In device 1000, mid microphone cartridge 201 and mid microphone cartridge 1001 may each be, for example, cardioid microphone cartridges. Just as in device 200, the pickup pattern of mid microphone cartridge 201 in device 1000 may extend mainly in the positive Y-axis direction. Moreover, the pickup pattern of mid microphone cartridge 1001 may extend mainly in the opposite direction of the pickup pattern of mid microphone cartridge 201, in other words, mainly in the negative Y-axis direction. The location of control unit 302 in device 1000 (and in device 200) is arbitrary; control unit 302 may be located anywhere in device 1000 (and in device 200) as desired or as practical. The configuration of device 1000 may be useful as a spatial audio microphone, a desktop stereo microphone, and/or as a two-user microphone. When used as a two-user microphone, device 1000 may be oriented, for example, such that mid microphone cartridge 201 is generally facing toward a first user and such that mid microphone cartridge 1001 is generally facing toward a second user.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A microphone comprising:

a cardioid microphone cartridge;

a first bidirectional microphone cartridge; and a second bidirectional microphone cartridge, wherein each of the first bidirectional microphone cartridge and the second bidirectional microphone cartridge is directed orthogonally to each other and to the cardioid microphone cartridge, wherein the microphone is configured to steer a direction of maximum sensitivity of the microphone by at least performing a weighted summation of a first audio signal corresponding to the first bidirectional microphone cartridge, a second audio signal corresponding to the second bidirectional microphone cartridge, and a third audio signal corresponding to the cardioid microphone cartridge.

2. The microphone of claim 1, wherein the microphone is configured to generate left and right stereo audio signals.

3. The microphone of claim 1, wherein the microphone is configured to steer the direction of maximum sensitivity anywhere in a half-sphere region.

4. The microphone of claim 1, wherein the microphone is configured to generate a toroidal polar pickup pattern by summing a 90-degree phase shifted version of the first audio signal with the second audio signal.

5. The microphone of claim 4, wherein the microphone is configured to perform a 90-degree phase shift of the first audio signal using a Hilbert transformation.

6. The microphone of claim 1, further comprising a second cardioid microphone cartridge oriented in an opposite direction as the cardioid microphone cartridge.

7. The microphone of claim 1, further comprising a second cardioid microphone cartridge, wherein the first bidirectional microphone cartridge and the second bidirectional microphone cartridge are each disposed between the cardioid microphone cartridge and the second cardioid microphone cartridge.

8. The microphone of claim 1, wherein the microphone is configured to perform the weighted summation by at least:

scaling the first audio signal;

scaling the second audio signal;

scaling the third audio signal;

combining the scaled first audio signal with the scaled second audio signal to produce a fourth audio signal;

scaling the fourth audio signal; and combining the scaled fourth audio signal with the scaled third audio signal to produce a fifth audio signal.

9. The microphone of claim 8, wherein the microphone is configured to perform an elevation-dependent sensitivity correction to the fifth audio signal.

10. A method for operating a microphone, the method comprising:

generating a first audio signal based on sound detected by a first bidirectional microphone cartridge;

generating a second audio signal based on sound detected by a second bidirectional microphone cartridge;

generating a third audio signal based on sound detected by a cardioid microphone cartridge, wherein each of the first bidirectional microphone cartridge and the second bidirectional microphone cartridge is directed orthogonally to each other and to the cardioid microphone cartridge; and steering a direction of maximum sensitivity of the microphone by at least performing a weighted summation of the first audio signal, the second audio signal, and the third audio signal.

11. The method of claim 10, further comprising shifting the first audio signal by 90 degrees to generate a 90-degree shifted audio signal; and generating a toroidal polar pickup pattern of the microphone by combining the 90-degree shifted audio signal with the second audio signal.

12. The method of claim 10, further comprising performing a Hilbert transformation on the first audio signal to generate a transformed audio signal; and generating a pickup pattern of the microphone by combining the transformed audio signal with the second audio signal.

13. The method of claim 10, wherein the performing the weighted summation comprises:

scaling the first audio signal;

scaling the second audio signal;

scaling the third audio signal;

combining the scaled first audio signal with the scaled second audio signal to produce a fourth audio signal;

scaling the fourth audio signal; and combining the scaled fourth audio signal with the scaled third audio signal to produce a fifth audio signal.

14. The method of claim 10, further comprising generating an audio signal based on sound detected by a second cardioid microphone oriented in an opposite direction as the cardioid microphone cartridge.

15. A method for operating a microphone, the method comprising:

generating a first audio signal based on sound detected by a first bidirectional microphone cartridge;

scaling, based on a control signal, the first audio signal to affect an azimuth angle of a pickup pattern of the microphone;

generating a second audio signal based on sound detected by a second bidirectional microphone cartridge that is directed orthogonally to the first bidirectional microphone cartridge;

generating a third audio signal by at least shifting the second audio signal by 90 degrees; and combining the scaled first audio signal with the third audio signal to generate the pickup pattern of the microphone.

16. The method of claim 15, wherein the shifting the second audio signal comprises performing a Hilbert transformation on the second audio signal.

17. The method of claim 15, further comprising generating a fourth audio signal based on sound detected by a cardioid microphone cartridge, wherein the cardioid microphone cartridge is directed orthogonally to the first bidirectional microphone cartridge and the second bidirectional microphone cartridge, and wherein the pickup pattern is further based on the fourth audio signal.

18. The method of claim 15, wherein the pickup pattern of the microphone comprises a toroidal pickup pattern.

19. The method of claim 15, wherein the generating the second audio signal comprises:

generating a fourth audio signal based on the sound detected by the second bidirectional microphone cartridge; and scaling the fourth audio signal to result in the second audio signal.

20. The microphone of claim 1, wherein the microphone comprises circuitry configured to perform the weighted summation of the first audio signal, the second audio signal, and the third audio signal.

21. The microphone of claim 1, further comprising:

one or more processors; and memory storing instructions that, when executed by the one or more processors, configures the microphone to perform the weighted summation of the first audio signal, the second audio signal, and the third audio signal.

22. The method of claim 10, wherein the steering comprises steering the direction of maximum sensitivity anywhere in a half-sphere region.

* * * * *